US011921957B2

United States Patent
Osborn et al.

(10) Patent No.: US 11,921,957 B2
(45) Date of Patent: Mar. 5, 2024

(54) FOLLOW-THE-LEADER CONTROL OF TAPPING DEVICES

(71) Applicant: Capital One Services, LLC, McLean, VA (US)

(72) Inventors: Kevin Osborn, Newton Highlands, MA (US); Joshua Edwards, Philadelphia, PA (US); Latika Gulati, Vienna, VA (US)

(73) Assignee: Capital One Services, LLC, McLean, VA (US)

( * ) Notice: Subject to any disclaimer, the term of this patent is extended or adjusted under 35 U.S.C. 154(b) by 7 days.

(21) Appl. No.: 17/545,101

(22) Filed: Dec. 8, 2021

(65) Prior Publication Data

US 2023/0176694 A1 Jun. 8, 2023

(51) Int. Cl.
| | | |
|---|---|---|
| *G06F 3/042* | (2006.01) | |
| *G06F 3/041* | (2006.01) | |
| *G06N 20/00* | (2019.01) | |
| *G06V 10/764* | (2022.01) | |
| *G06V 40/20* | (2022.01) | |

(52) U.S. Cl.
CPC .......... *G06F 3/0425* (2013.01); *G06F 3/0416* (2013.01); *G06N 20/00* (2019.01); *G06V 10/764* (2022.01); *G06V 40/20* (2022.01)

(58) Field of Classification Search
CPC ..... G06F 3/0425; G06F 3/0416; G06N 20/00; G06V 40/20; G06V 10/764
See application file for complete search history.

(56) References Cited

U.S. PATENT DOCUMENTS

| | | | |
|---|---|---|---|
| 9,024,899 B2 * | 5/2015 | Rovito | G06F 11/2221 |
| | | | 345/173 |
| 9,940,221 B2 | 4/2018 | Knoulich | |
| 10,853,232 B2 | 12/2020 | Henry et al. | |
| 10,953,550 B2 * | 3/2021 | Jenkinson | B25J 9/02 |
| 11,593,828 B2 * | 2/2023 | Loucks | G06F 3/0482 |
| 2012/0280934 A1 * | 11/2012 | Ha | G06F 11/2221 |
| | | | 901/14 |
| 2013/0141388 A1 * | 6/2013 | Ludwig | H03K 17/96 |
| | | | 345/174 |
| 2014/0253513 A1 * | 9/2014 | Matsubara | G06F 3/017 |
| | | | 345/175 |
| 2014/0309775 A1 * | 10/2014 | Jenkinson | G01L 25/00 |
| | | | 700/250 |

* cited by examiner

*Primary Examiner* — Doon Y Chow
(74) *Attorney, Agent, or Firm* — Sterne, Kessler, Goldstein & Fox P.L.L.C.

(57) ABSTRACT

Embodiments disclosed are directed to a computing system that performs steps for providing follow-the-leader tapping control signals to one or more tapping devices. The computing system captures an interaction between a first user device and a user of the first user device. The computing system then generates a tapping control signal configured to instruct a tapping device to interact with a second user device based on the captured interaction. Subsequently, the computing system transmits the tapping control signal to the tapping device.

20 Claims, 5 Drawing Sheets

FOLLOW-THE-LEADER CONTROL OF TAPPING DEVICES

TECHNICAL FIELD

Embodiments relate to application testing, specifically a system that performs follow-the-leader tapping on one or more user device using one or more tapping devices.

BACKGROUND

A manual tester (e.g., a quality assurance engineer) can use a robotic tapping device to test the functionality of an application running on multiple different devices, such as newer and older versions of smartphones offered by different manufacturers. When testing applications with an authentication element (e.g., a login that requires a username and password) on different devices, the automated test scripts used by the tapping device must gain access to authentication credentials, such as usernames, passwords, or both. However, the storage of these scripts and credentials can cause a security vulnerability as well as limit the number of accounts that can be tested by the tapping device to only those accounts that can have their credentials stored.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art to make and use the embodiments.

DETAILED DESCRIPTION

Figure 1:
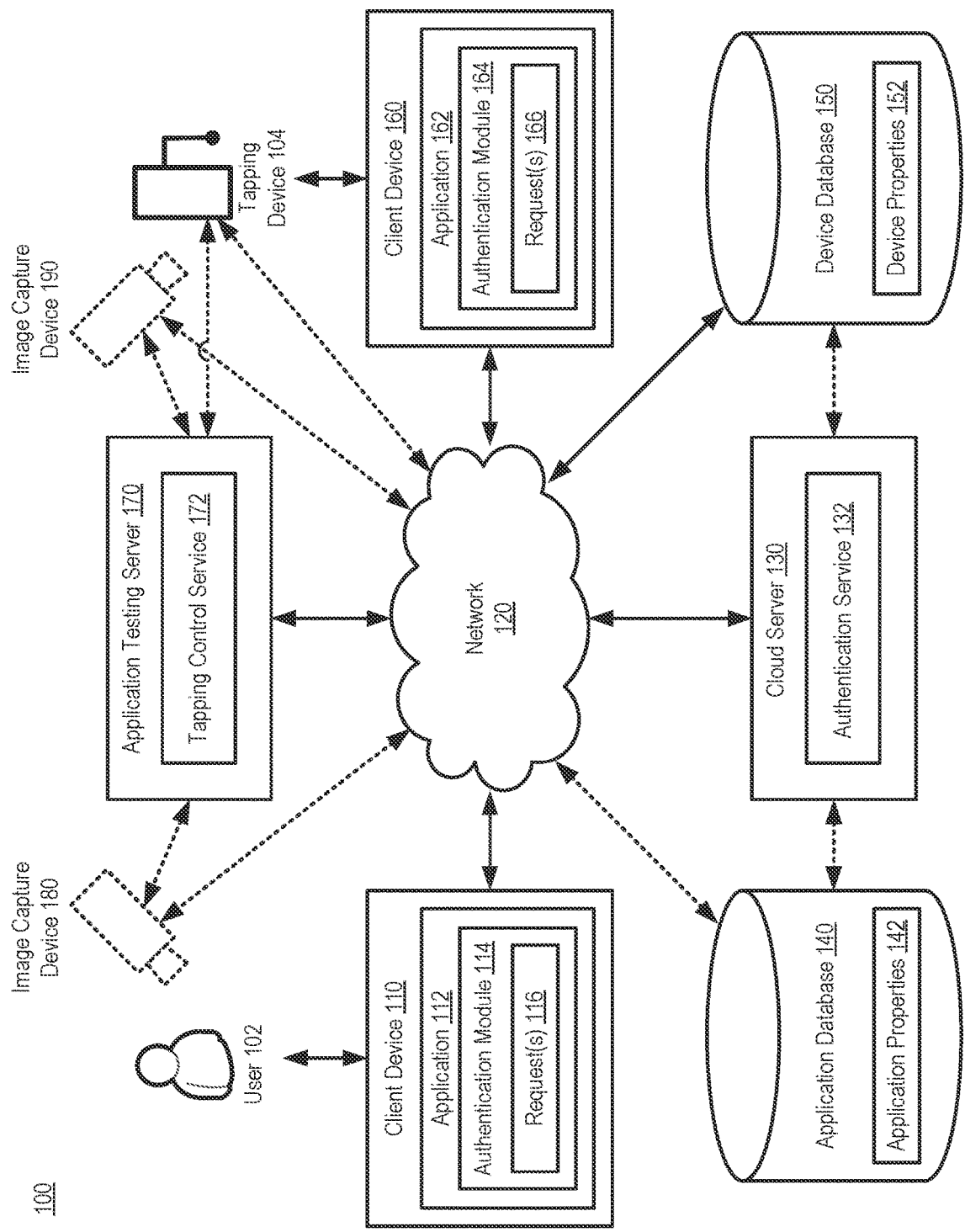
FIG. 1 is an example system for follow-the-leader tapping control according to some embodiments.

Embodiments disclosed herein relate to systems and methods for follow-the-leader tapping control. The systems and methods disclosed herein can achieve follow-the-leader tapping control by generating follow-the-leader tapping control signals and transmitting those control signals to one or more tapping devices configured to tap (e.g., click, long press, hard press, soft press, tap-and-move, swipe, any other suitable interaction, or any combination thereof) the display screens, buttons, or keys of one or more user devices based on the control signals.

In several embodiments, by connecting a series of tapping devices, where each tapping device is connected to a different physical device having a different configuration (e.g., different iOS™ versions, different iPhone™ versions, different Android™ devices, etc.), the systems and methods disclosed herein can allow a manual tester to test an application on multiple devices at substantially the same time. For example, the manual tester can perform an action on a "lead" device. The systems and methods disclosed herein can translate that action to all of the other devices so that they can also perform that action, which may require performing the action differently on different devices based on the configurations of those devices. Using computer vision, the systems and methods disclosed herein can translate the instruction so that it would be cross-device compatible. For instance, when clicking on a button, instead of looking for a very specific code element or clicking on the same coordinates on the secondary device as on the lead device, the systems and methods disclosed herein can look for a button with matching text (e.g., in the same or different size, font, color, language, etc.) on the other devices and configure the tapping device for each secondary device to click on the corresponding button. After each step, cameras configured on both the lead device and the secondary devices can look at the visual elements rendered and determine if any visual elements are missing or different on the secondary devices in comparison to the lead device. If so, the systems and methods disclosed herein can notify the manual tester so that the manual tester can investigate the cause of the differences before continuing to the next step.

In several embodiments, by having all of the other devices perform the steps in a stateless follow-the-leader style, the systems and methods disclosed herein can provide and then forget each element of the credential. For instance, the systems and methods disclosed herein can translate the instruction "type 'password'" into the modified instruction "press 'ID' button," "press 'a' button," and so forth. As a result, the number of accounts that a manual tester is able to test with is significantly expanded beyond only those accounts that can have their credentials stored.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The term "service" or "services" referred to herein can include a collection of modules or units. A collection of modules or units may be arranged, for example, in software or hardware libraries or development kits in embodiments of the present disclosure in accordance with the context in which the term is used. For example, the software or hardware libraries and development kits may be a suite of data and programming code, for example pre-written code, classes, routines, procedures, scripts, configuration data, or a combination thereof, that may be called directly or through an application programming interface (API) to facilitate the execution of functions of the system.

The modules, units, or services in the following description of the embodiments may be coupled to one another as described or as shown. The coupling may be direct or indirect, without or with intervening items between coupled modules, units, or services. The coupling may be by physical contact or by communication between modules, units, or services.

System Overview and Function

FIG. 1 is an example system 100 for follow-the-leader tapping control according to some embodiments. In several embodiments, system 100 can include a client device 110 associated with a user 102, a client device 160 associated with a tapping device 104 (e.g., a robotic device such as a selective compliance articulated robot arm (SCARA) device), a network 120, a cloud server 130, an application database 140, a device database 150, an application testing server 170, an image capture device 180 (e.g., a camera such as a depth camera) having a field of view of the client device 110, and an image capture device 190 (e.g., a camera such as a depth camera) having a field of view of the client device 160. In several embodiments, the client device 110 can further include an application 112 which, in several embodiments, includes an authentication module 114 having access to a plurality of device attributes stored on, or in association with, the client device 110. In several embodiments, the client device 160 can further include an application 162 which, in several embodiments, includes an authentication module 164 having access to a plurality of device attributes stored on, or in association with, the client device 160. In several embodiments, the cloud server 130 can further include an authentication service 132. In several embodiments, the application testing server 170 can further include a tapping control service 172.

The client device 110 and the client device 160 may be any of a variety of centralized or decentralized computing devices. For example, one or both of the client device 110 and the client device 160 may be a mobile device, a smartphone, a smart watch, a tablet computer, a laptop computer, a desktop computer, or a point-of-sale (POS) device. In several embodiments, one or both of the client device 110 and the client device 160 can function as a stand-alone device separate from other devices of the system 100. The term "stand-alone" can refer to a device being able to work and operate independently of other devices. In several embodiments, the client device 110 and the client device 160 can store and execute the application 112 and the application 162, respectively.

Each of the application 112 and the application 162 may refer to a discrete software that provides some specific functionality. For example, the application 112 may be a mobile application that allows the user 102 to perform some functionality, whereas the application 162 may be a mobile application that allows the tapping device 104 to perform some functionality. The functionality can, for example and without limitation, allow the user 102, the tapping device 104, or both to perform banking, data transfers, or commercial transactions. In other embodiments, one or more of the application 112 and the application 162 may be a desktop application that allows the user 102 or the tapping device 104 to perform the aforementioned functionalities.

In several embodiments, the client device 110 and the client device 160 can be coupled to the cloud server 130, the application testing server 170, or both via a network 120. The cloud server 130 may be part of a backend computing infrastructure, including a server infrastructure of a company or institution, to which the application 112 and the application 162 belong. While the cloud server 130 and the application testing server 170 are described and shown as single components in FIG. 1, this is merely an example. In some embodiments, the cloud server 130, the application testing server 170, or both can comprise a variety of centralized or decentralized computing devices. For example, the cloud server 130, the application testing server 170, or both can include a mobile device, a laptop computer, a desktop computer, grid-computing resources, a virtualized computing resource, cloud computing resources, peer-to-peer distributed computing devices, a server farm, or a combination thereof. The cloud server 130, the application testing server 170, or both can be centralized in a single room, distributed across different rooms, distributed across different geographical locations, or embedded within the network 120. While the devices comprising the cloud server 130, the application testing server 170, or both can couple with the network 120 to communicate with the client device 110 and the client device 160, the devices of the cloud server 130, the application testing server 170, or both can also function as stand-alone devices separate from other devices of the system 100.

In several embodiments, the cloud server 130, the application testing server 170, or both can be implemented using cloud computing resources of a public or private cloud. Examples of a public cloud include, without limitation, Amazon Web Services (AWS)™, IBM Cloud™, Oracle Cloud Solutions™, Microsoft Azure Cloud™, and Google Cloud™. A private cloud refers to a cloud environment similar to a public cloud with the exception that it is operated solely for a single organization.

In several embodiments, the cloud server 130 can couple to the client device 110 to allow the application 112 to function. For example, in several embodiments, both the client device 110 and the cloud server 130 can have at least a portion of the application 112 installed thereon as instructions on a non-transitory computer readable medium. The client device 110 and the cloud server 130 can both execute portions of the application 112 using client-server architectures, to allow the application 112 to function.

In several embodiments, the cloud server 130 can couple to the client device 160 to allow the application 162 to function. For example, in several embodiments, both the client device 160 and the cloud server 130 can have at least a portion of the application 162 installed thereon as instructions on a non-transitory computer readable medium. The client device 160 and the cloud server 130 can both execute portions of the application 162 using client-server architectures, to allow the application 162 to function.

In several embodiments, the application testing server 170 can couple to the client device 110 to transmit data to and receive data from the client device 160. For example, the application testing server 170 can couple to the client device 110 to transmit a notification indicative of any visual elements that are missing or different on the client device 160 in comparison to the client device 110, a sequence of screen capture images of a display screen of the client device 160, any other suitable electronic information, or any combination thereof to the client device 110.

In several embodiments, the application testing server 170 can couple to the client device 160 to transmit data to and receive data from the client device 160. For example, the application testing server 170 can couple to the client device 160 to transmit a scrolling control signal to the client device 160, where the scrolling control signal is configured to instruct the client device 160 to attempt to find an interaction element by scrolling when that interaction element cannot be found by direct observation (e.g., either by the image capture device 190, or by the client device 160 using screen capture or recording) of the display screen of the client device 160. In another example, the application testing server 170 can couple to the client device 160 to receive a sequence of screen capture images from the client device 160 (e.g., captured by the client device 160 using screen capture or screen recording).

In several embodiments, the cloud server 130, the application testing server 170, or both can transmit requests and other data to, and receive requests, indications, device attributes, images, and other data from, the authentication module 114, the authentication module 164 (and in effect the client device 110 and the client device 160, respectively), the image capture device 180, and the image capture device 190 via the network 120. The network 120 refers to a telecommunications network, such as a wired or wireless network. The network 120 can span and represent a variety of networks and network topologies. For example, the network 120 can include wireless communications, wired communications, optical communications, ultrasonic communications, or a combination thereof. For example, satellite communications, cellular communications, Bluetooth, Infrared Data Association standard (IrDA), wireless fidelity (Wi-Fi), and worldwide interoperability for microwave access (WiMAX) are examples of wireless communications that may be included in the network 120. Cable, Ethernet, digital subscriber line (DSL), fiber optic lines, fiber to the home (FTTH), and plain old telephone service (POTS) are examples of wired communications that may be included in the network 120. Further, the network 120 can traverse a number of topologies and distances. For example, the network 120 can include a direct connection, personal area network (PAN), local area network (LAN), metropolitan area network (MAN), wide area network (WAN), or a combination thereof. For illustrative purposes, in the embodiment of FIG. 1, the system 100 is shown with the client device 110, the client device 160, the cloud server 130, the application testing server 170, the image capture device 180, and the image capture device 190 as end points of the network 120. This, however, is an example and it is to be understood that the system 100 can have a different partition between the client device 110, the client device 160, the cloud server 130, the application testing server 170, the image capture device 180, the image capture device 190, and the network 120. For example, the client device 110, the client device 160, the cloud server 130, the application testing server 170, the image capture device 180, and the image capture device 190 can also function as part of the network 120.

In several embodiments, the client device 110 and the client device 160 can include at least the authentication module 114 and the authentication module 164, respectively. In several embodiments, each of the authentication module 114 and the authentication module 164 may be a module of the application 112 and the application 162, respectively. In several embodiments, the authentication module 114 and the authentication module 164 can enable the client device 110 and the client device 160, respectively, and/or the application 112 and the application 162, respectively, to receive requests and other data from, and transmit requests, device attributes, indications, and other data to, the authentication service 132 and/or the cloud server 130 via the network 120. In several embodiments, this may be done by having the authentication module 114 and the authentication module 164 couple to the authentication service 132 via an API to transmit and receive data as a variable or parameter.

In several embodiments, the cloud server 130 can include at least the authentication service 132. In several embodiments, the authentication service 132 may be implemented as a software application on the cloud server 130. In several embodiments, the authentication service 132 can enable receipt of electronic information (e.g., device attributes, application properties) from the authentication module 114 and the authentication module 164. This may be done, for example, by having the authentication service 132 couple to the authentication module 114 and the authentication module 164 via a respective API to receive the electronic information as a variable or parameter. In several embodiments, the authentication service 132 can further enable storage of the electronic information in a local storage device or transmission (e.g., directly, or indirectly via the network 120) of the electronic information to the application database 140, the device database 150, or both for storage and retrieval.

The application database 140 may be a database or repository used to store application properties 142, any other suitable data, or any combination thereof for one or more applications and versions thereof. For example, the application database 140 can store, in a list or as table entries, the application information for the application 112 and the application 162 as separate entries in the application properties 142. The device database 150 may be a database or repository used to store the device properties 152, any other suitable data, or any combination thereof for one or more devices, such as client devices and user devices. For example, the device database 150 can store, in a list or as table entries, the device information (e.g., manufacturer, model, model year, operating system, operating system version, identification information (e.g., serial number), etc.) for the client device 110 and the client device 160 as the device properties 152.

In a variety of embodiments, the authentication service 132 of the cloud server 130 can provide for authenticating a client device 110 that is attempting to perform an action using the application 112, such as attempting to login (e.g. entering a username, password, single-use code, etc.) or make a transaction (e.g., a purchase, a balance transfer, adding an authorized user, etc.). For example, the cloud server 130 can receive, from the client device 110 in response to input from the user 102, an electronic request to perform an action. The cloud server 130 can authenticate the client device 110 to verify that an identity of the user 102 is authentic.

In a variety of embodiments, the tapping control service 172 of the application testing server 170 can provide for generating follow-the-leader tapping control signals, where the "leader" device is the client device 110 operated by the user 102, and transmitting those control signals to one or more tapping devices, including, but not limited to, the tapping device 104.

In several embodiments, the tapping control service 172 can utilize a computer vision technique to capture (e.g., using the image capture device 180 or the client device 110 (e.g., using screen capture or recording)) an interaction between the client device 110 and the user 102. The interaction can be, for example, a click, long press, hard press, soft press, tap-and-move, swipe, or other suitable interaction between a first interaction element displayed on a first display screen of the client device 110 and a finger of the user 102, such as the user 102 pressing a virtual button or entering information in a virtual text box (e.g., username, password, numbers, account nicknames, etc.) displayed on a touchscreen display of the client device 110. In several embodiments, the tapping control service 172 can utilize a computer vision technique to capture (e.g., using the image capture device 190 or the client device 160 (e.g., using screen capture or recording)) a second display screen of the second user device and identify a second interaction element displayed on a second display screen of the second user device and corresponding to the first interaction element, such as a virtual button displayed on a touchscreen display of the client device 160 that corresponds to the virtual button pressed by the user 102 on the touchscreen display of the client device 110. In several embodiments, the tapping control service 172 can identify a plurality of electronic objects displayed on the second display screen of the second user device and identify the second interaction element based on one of the plurality of electronic objects that corresponds to the first interaction element.

In several embodiments, the tapping control service 172 can generate a tapping control signal configured to instruct the tapping device 104 to interact with the client device 160 based on the captured interaction. In several embodiments, the application testing server 210 can generate the tapping control signal by classifying the tapping control signal as a classified tapping control signal using the object recognition classifier machine learning model 212 (e.g., the object recognition classifier machine learning model 212 described with reference to FIG. 2). In several embodiments, the tapping control signal can be configured to instruct the tapping device 104 to tap the second interaction element. For example, the tapping control signal can be configured to instruct the tapping device 104 to press the virtual button displayed on the touchscreen display of the client device 160 that corresponds to the virtual button displayed on the touchscreen display of the client device 110 and pressed by the user 102.

In several embodiments, a first display property of the first interaction element can correspond to a second display property of the second interaction element. For example, where the first interaction element is a first virtual button displayed on the touchscreen display of the client device 110, and the second interaction element is a second virtual button displayed on the touchscreen display of the client device 160, the first and second virtual buttons may be located in substantially the same display position or a different display position (even off screen); substantially the same size and aspect ratio or a different size, aspect ratio, or both; substantially the same color or a different color; have substantially the same text in the same language or corresponding text in a different language; have substantially the same text in the same font and font size or a different font, font size, or both; have any other suitable similarities or differences; or any combination thereof. In several embodiments, the second display property can be different from the first display property. For example, the first display property can be a rectangle having the text "Password" and second display property can be a rectangle having the text "Contraseria," which is the Spanish-language equivalent of the English word "Password." In another example, the first display property can be a rectangle surrounding the text "Username" in Times New Roman 12-point font, and second display property can be a rectangle below the text "Username:" in Times New Roman 6-point font.

In several embodiments, the tapping control service 172 can transmit the tapping control signal to the tapping device 104, either directly or indirectly via the network 120.

Figure 2:
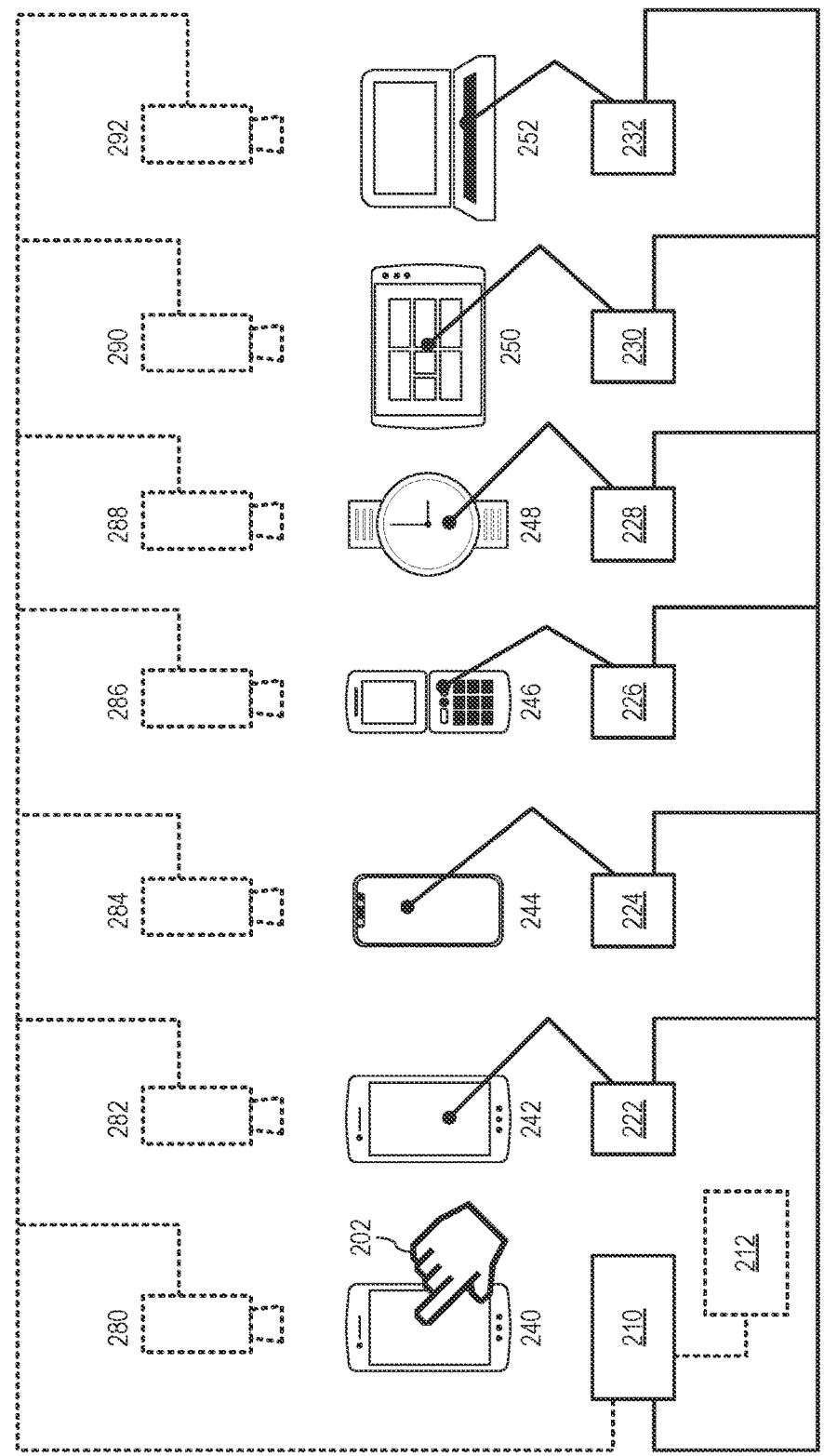
FIG. 2 is another example system for follow-the-leader tapping control according to some embodiments.

FIG. 2 is an example system 200 for follow-the-leader tapping control according to some embodiments. In several embodiments, system 200 can include an application testing server 210 (e.g., including a tapping control service); an object recognition classifier machine learning model 212; tapping devices 222, 224, 226, 228, 230, and 232 (e.g., robotic devices such as SCARA devices); user devices 240, 242, 244, 246, 248, 250, and 252 (e.g., smartphones, other phones, smart watches, tablet computers, laptop computers, etc., each having an application installed thereon); and image capture devices 280, 282, 284, 286, 288, 290, and 292 (e.g., cameras such as depth cameras).

In a variety of embodiments, the application testing server 210 can provide for generating follow-the-leader tapping control signals, where the "leader" device is the user device 240 operated by the user 202, and transmitting those control signals to one or more tapping devices, including, but not limited to, the tapping devices 222, 224, 226, 228, 230, and 232. The tapping devices 222, 224, 226, 228, 230, and 232 can be configured to interact with the user devices 240, 242, 244, 246, 248, 250, and 252, respectively, based on the control signals received from the application testing server 210 (e.g., to substantially mimic or reproduce user interactions with the "lead" user device 240). In several embodiments, the application testing server 210 can provide for generating the control signals using computer vision techniques in combination with captured images received from the image capture devices 280, 282, 284, 286, 288, 290, and 292, each of which can be positioned to capture images of a respective one of the user devices 240, 242, 244, 246, 248, 250, and 252. In several embodiments, the application testing server 210 can provide for generating the control signals using an object recognition classifier machine learning model 212.

In several embodiments, each of the user devices 240, 242, 244, 246, 248, 250, and 252 can be different from one another. For example, the user device 240 and the user device 242 can be smartphones having the same manufacturer and model (e.g., model identifier) but different operating system versions (e.g., the user device 242 can have an older operating system version than the user device 240). In another example, the user device 244 can be another smartphone having a manufacturer, model, and operating system different from the user device 240 (or, in some instances, the same manufacturer). In another example, the user device 246 can be a flip phone having a manufacturer, model, and operating system different from the user device 240 (or, in some instances, the same manufacturer). In another example, the user device 248 can be a smart watch having a manufacturer, model, and operating system different from the user device 240 (or, in some instances, the same manufacturer). In another example, the user device 250 can be a tablet computer having a manufacturer, model, and operating system different from the user device 240 (or, in some instances, the same manufacturer). In another example, the user device 252 can be a laptop computer having a manufacturer, model, and operating system different from the user device 240 (or, in some instances, the same manufacturer).

In several embodiments, the application testing server 210 can utilize the image capture device 280 to capture a first interaction between the user device 240 and the user 202. The captured first interaction can be, for example, a click, long press, hard press, soft press, tap-and-move, swipe, or other suitable interaction between a first interaction element displayed on a display screen of the user device 240 and a finger of the user 202, such as the user 202 pressing a virtual button or entering information in a virtual text box (e.g., username, password, numbers, account nicknames, etc.) displayed on a touchscreen display of the user device 240.

In several embodiments, the application testing server 210 can utilize the image capture device 282 and a computer vision technique to identify a second interaction element displayed on a display screen of the user device 242 and corresponding to the first interaction element, such as a virtual button displayed on a touchscreen display of the user device 242 that corresponds to the virtual button pressed by the user 202 on the touchscreen display of the user device 240. In several embodiments, the application testing server 210 can identify a plurality of electronic objects displayed on the display screen of the user device 242 and identify the second interaction element based on one of the plurality of electronic objects that corresponds to the first interaction element. In several embodiments, the application testing server 210 can generate a first tapping control signal configured to instruct the tapping device 222 to interact with the user device 242 based on the captured first interaction. In several embodiments, the first tapping control signal can be configured to instruct the tapping device 222 to tap (e.g., click, long press, hard press, soft press, tap-and-move, swipe, any other suitable interaction, or any combination thereof) the second interaction element to emulate the first interaction between the first interaction element displayed on the display screen of the user device 240 and the finger of the user 202. For example, the first tapping control signal can be configured to instruct the tapping device 222 to press the virtual button displayed on the touchscreen display of the user device 242 that corresponds to the virtual button displayed on the touchscreen display of the user device 240 and pressed by the user 202. In several embodiments, the application testing server 210 can transmit the first tapping control signal to the tapping device 222, either directly or indirectly via a network (e.g., the network 120).

In several embodiments, the application testing server 210 can utilize the image capture device 284 and a computer vision technique to identify a third interaction element displayed on a display screen of the user device 244 and corresponding to the first interaction element, such as a virtual button displayed on a touchscreen display of the user device 244 that corresponds to the virtual button pressed by the user 202 on the touchscreen display of the user device 240. In several embodiments, the application testing server 210 can identify a plurality of electronic objects displayed on the display screen of the user device 244 and identify the third interaction element based on one of the plurality of electronic objects that corresponds to the first interaction element. In several embodiments, the application testing server 210 can generate a second tapping control signal configured to instruct the tapping device 224 to interact with the user device 244 based on the captured interaction. In several embodiments, the second tapping control signal can be configured to instruct the tapping device 224 to tap the third interaction element. For example, the second tapping control signal can be configured to instruct the tapping device 224 to press the virtual button displayed on the touchscreen display of the user device 244 that corresponds to the virtual button displayed on the touchscreen display of the user device 240 and pressed by the user 202. In several embodiments, the application testing server 210 can transmit the second tapping control signal to the tapping device 224, either directly or indirectly via a network.

In several embodiments, the application testing server 210 can utilize the image capture device 286 and a computer vision technique to identify a fourth interaction element on the user device 246 and corresponding to the first interaction element, such as a physical button or sequence of physical button presses on the user device 246 that corresponds to the virtual button pressed by the user 202 on the touchscreen display of the user device 240. In several embodiments, the application testing server 210 can identify a plurality of electronic objects displayed on the display screen of the user device 246 and identify the fourth interaction element based on one of the plurality of electronic objects that corresponds to the first interaction element. In several embodiments, the application testing server 210 can generate a third tapping control signal configured to instruct the tapping device 226 to interact with the user device 246 based on the captured interaction. In several embodiments, the third tapping control signal can be configured to instruct the tapping device 226 to tap the fourth interaction element. For example, the third tapping control signal can be configured to instruct the tapping device 226 to press the virtual button displayed on the touchscreen display of the user device 246 that corresponds to the virtual button displayed on the touchscreen display of the user device 240 and pressed by the user 202. In several embodiments, the application testing server 210 can transmit the third tapping control signal to the tapping device 226, either directly or indirectly via a network.

In several embodiments, the application testing server 210 can utilize the image capture device 288 and a computer vision technique to identify a fifth interaction element displayed on a display screen of the user device 248 and corresponding to the first interaction element, such as a virtual button displayed on a touchscreen display of the user device 248 that corresponds to the virtual button pressed by the user 202 on the touchscreen display of the user device 240. In several embodiments, the application testing server 210 can identify a plurality of electronic objects displayed on the display screen of the user device 248 and identify the fifth interaction element based on one of the plurality of electronic objects that corresponds to the first interaction element. In several embodiments, the application testing server 210 can generate a fourth tapping control signal configured to instruct the tapping device 228 to interact with the user device 248 based on the captured interaction. In several embodiments, the fourth tapping control signal can be configured to instruct the tapping device 228 to tap the fifth interaction element. For example, the fourth tapping control signal can be configured to instruct the tapping device 228 to press the virtual button displayed on the touchscreen display of the user device 248 that corresponds to the virtual button displayed on the touchscreen display of the user device 240 and pressed by the user 202. In several embodiments, the application testing server 210 can transmit the fourth tapping control signal to the tapping device 228, either directly or indirectly via a network.

In several embodiments, the application testing server 210 can utilize the image capture device 290 and a computer vision technique to identify a sixth interaction element displayed on a display screen of the user device 250 and corresponding to the first interaction element, such as a virtual button displayed on a touchscreen display of the user device 250 that corresponds to the virtual button pressed by the user 202 on the touchscreen display of the user device 240. In several embodiments, the application testing server 210 can identify a plurality of electronic objects displayed on the display screen of the user device 250 and identify the sixth interaction element based on one of the plurality of electronic objects that corresponds to the first interaction element. In several embodiments, the application testing server 210 can generate a fifth tapping control signal configured to instruct the tapping device 230 to interact with the user device 250 based on the captured interaction. In several embodiments, the fifth tapping control signal can be configured to instruct the tapping device 230 to tap the sixth interaction element. For example, the fifth tapping control signal can be configured to instruct the tapping device 230 to press the virtual button displayed on the touchscreen display of the user device 250 that corresponds to the virtual button displayed on the touchscreen display of the user device 240 and pressed by the user 202. In several embodiments, the application testing server 210 can transmit the fifth tapping control signal to the tapping device 230, either directly or indirectly via a network.

In several embodiments, the application testing server 210 can utilize the image capture device 292 and a computer vision technique to identify a seventh interaction element on the user device 252 and corresponding to the first interaction element, such as a physical button or sequence of physical button presses on the user device 252 that corresponds to the virtual button pressed by the user 202 on the touchscreen display of the user device 240. In several embodiments, the application testing server 210 can identify a plurality of electronic objects displayed on the display screen of the user device 252 and identify the seventh interaction element based on one of the plurality of electronic objects that corresponds to the first interaction element. In several embodiments, the application testing server 210 can generate a sixth tapping control signal configured to instruct the tapping device 232 to interact with the user device 252 based on the captured interaction. In several embodiments, the sixth tapping control signal can be configured to instruct the tapping device 232 to tap the seventh interaction element. For example, the sixth tapping control signal can be configured to instruct the tapping device 232 to press the virtual button displayed on the touchscreen display of the user device 252 that corresponds to the virtual button displayed on the touchscreen display of the user device 240 and pressed by the user 202. In several embodiments, the application testing server 210 can transmit the sixth tapping control signal to the tapping device 232, either directly or indirectly via a network.

In several embodiments, the application testing server 210 can generate one or more of the tapping control signals described herein by classifying the tapping control signal as a classified tapping control signal using the object recognition classifier machine learning model 212. The object recognition classifier machine learning model 212 can be trained by a process that includes determining a first probability value that the captured interaction corresponds to a first object of a first version of an application (e.g., the application 112) installed on the user device 240. The training process can further include classifying the captured interaction based on the first probability value to generate a classified interaction. The training process can further include, for each of the user devices 240, 242, 244, 246, 248, 250, and 252, determining a respective second probability value that a respective second object of a respective second version of the application installed on the respective user device corresponds to the first object. The training process can further include, for each of the user devices 240, 242, 244, 246, 248, 250, and 252, classifying the respective second object based on the respective second probability value to generate a respective classified second object. The training process can further include, for each of the user devices 240, 242, 244, 246, 248, 250, and 252, generating a respective classified tapping control signal based on the respective classified interaction and the respective classified second object.

Figure 3:
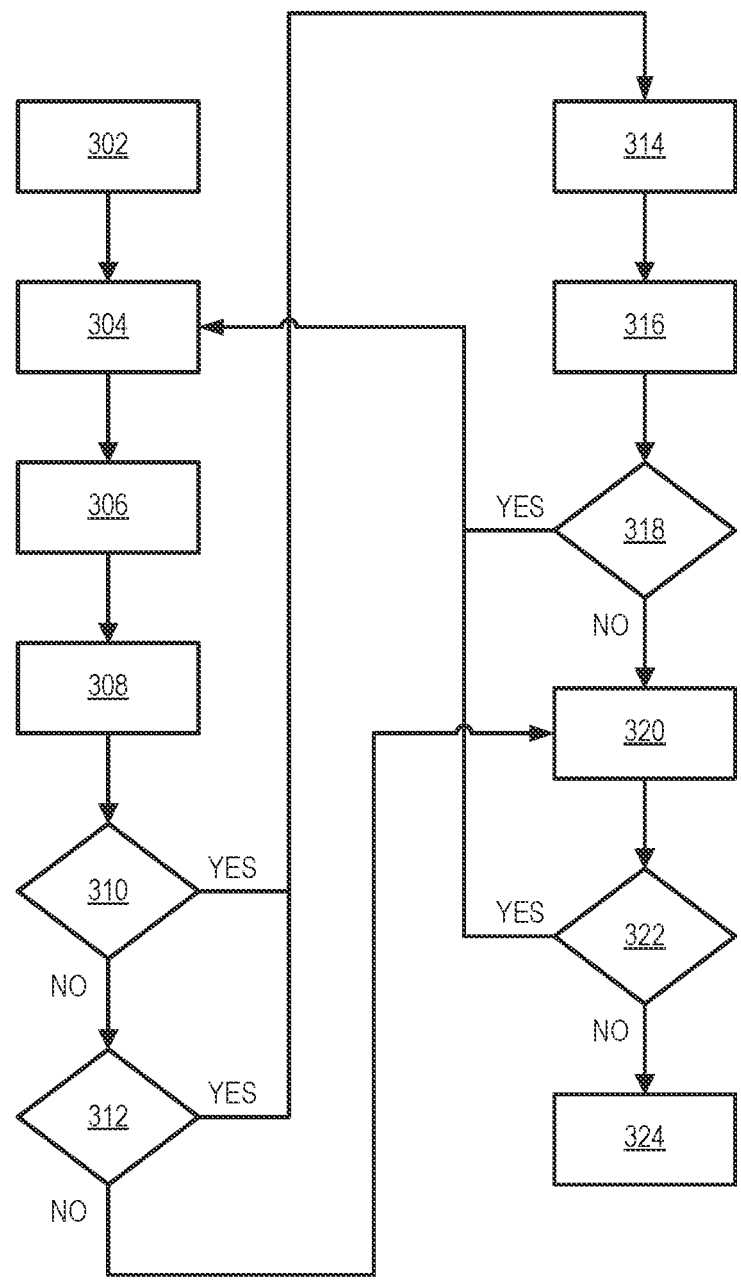
FIG. 3 illustrates an example process flow for follow-the-leader tapping control according to some embodiments.

FIG. 3 shows portions of an example process flow 300 for providing follow-the-leader tapping control signals to one or more tapping devices, according to some embodiments. The process flow 300 can be performed by a computing system, such as the system 100 described with reference to FIG. 1, the system 200 described with reference to FIG. 2, the architecture 500 described with reference to FIG. 5, or a combination thereof. For example, process flow 300 can provide an example of how the system 100, the system 200, the architecture 500, any other suitable computing system, or any combination thereof can operate. For the purposes of this example discussion of FIG. 3, it is to be understood that some or all of the application 112, including some or all of the authentication module 114, is installed on the client device 110. It is to be further understood that some or all of the application 162, including some or all of the authentication module 164, is installed on the client device 160. It is to be further understood that some or all of the tapping control service 172 is installed on the application testing server 170. It is to be further understood that some or all of the authentication service 132 is installed on the cloud server 130.

At 302, the process flow 300 begins by a manual tester (e.g., the user 202) setting up a series of tapping devices (e.g., the tapping devices 222, 224, 226, 228, 230, and 232) with different secondary devices (e.g., the user devices 242, 244, 246, 248, 250, and 252). At 304, the manual tester interacts with the lead device (e.g., the user device 240). At 306, the application testing server 210 translates the interaction between the manual tester and the lead device into a tapping control signal using computer vision (e.g., based on images captured by the image capture devices 280, 282, 284, 286, 288, 290, and 292; screen capture; etc.), machine learning (e.g., provided by the object recognition classifier machine learning model 212), or a combination thereof. At 308, the application testing server 210 sends the tapping control signal to each of the secondary devices.

At 310, the application testing server 210 determines, for each secondary device, whether an interaction element can be found on that device by direct observation. If so, the process flow 300 proceeds to 314. If not, the process flow 300 proceeds to 312. At 312, the application testing server 210 determines, for each secondary device for which an interaction element cannot be found by direct observation, whether an interaction element can be found by scrolling. If so, the process flow 300 proceeds to 314. If not, the process flow 300 proceeds to 320.

At 314, each of the secondary devices for which an interaction element can be found executes the tapping control signal. At 316, the application testing server 210 uses computer vision to translate the display screen into discrete objects. At 318, the application testing server 210 determines whether objects on the lead device match objects on the secondary devices (e.g., excluding objects below the screen cutoff). If so, the process flow 300 returns to 304 for the next interaction. If not, the process flow 300 proceeds to 320. At 320, the application testing server 210 uses an image capture device to capture the display screen of each secondary device for which an interaction element cannot be found by direct observation or by scrolling and sends each captured display screen to the manual tester. At 322, the application testing server 210 determines (e.g., based on input from the manual tester) whether each secondary device for which an interaction element cannot be found by direct observation or by scrolling can still follow the lead device. If so, the process flow 300 returns to 304 for the next interaction. If not, the process flow 300 proceeds to 324. At 324, the secondary devices for which an interaction element cannot be found by direct observation or by scrolling and that cannot still follow the lead device stop following the lead device.

Methods of Operation

Figure 4:
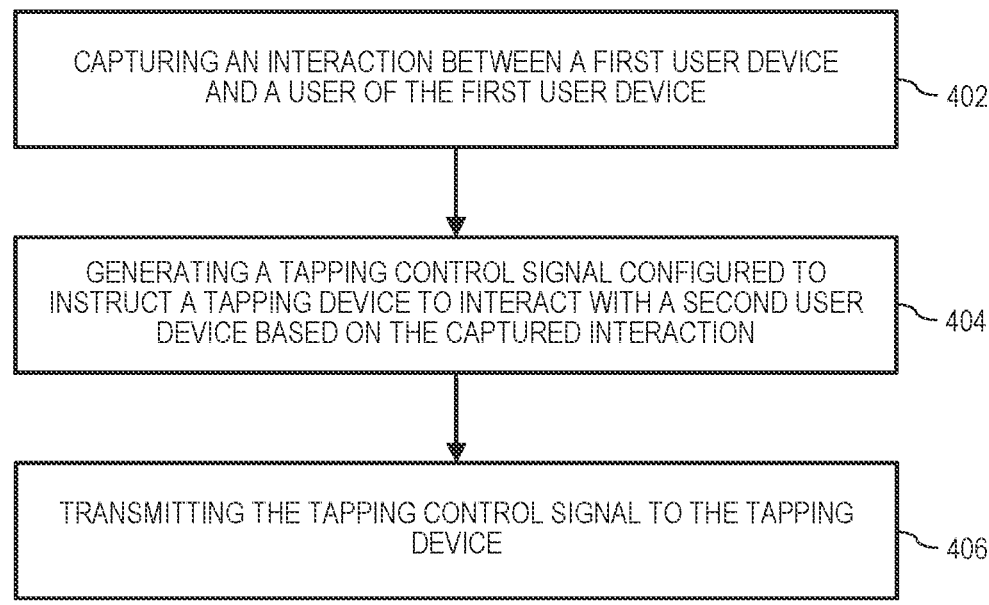
FIG. 4 illustrates an example method for follow-the-leader tapping control according to some embodiments.

FIG. 4 illustrate an example method 400 of operating the system 100 or the system 200 to provide for providing follow-the-leader tapping control signals to one or more tapping devices, according to some embodiments. For example, method 400 indicates how the application testing server 170 operates (e.g., utilizing the tapping control service 172 and the cloud server 130). Additionally or alternatively, method 400 can indicate how the application testing server 210 operates (e.g., utilizing the object recognition classifier machine learning model 212).

In several embodiments, operation 402 operates to allow the application testing server 170 to capture (e.g., by the image capture device 180) an interaction between a first user device (e.g., the client device 110) and a user of the first user device (e.g., the user 102). The interaction can be, for example, a virtual button pressed by the user 102 on a touchscreen display of the client device 110.

In several embodiments, operation 404 operates to allow the application testing server 170 to generate a tapping control signal configured to instruct a tapping device 104 to interact with a second user device (e.g., the client device 160) based on the captured interaction. For example, the application testing server 170 can generate the tapping control signal using a computer vision technique. In another example, the application testing server 170 can generate the tapping control signal by classifying the tapping control signal as a classified tapping control signal using the object recognition classifier machine learning model 212. The tapping control signal can include the classified tapping control signal. The object recognition classifier machine learning model 212 can be trained by a process that includes determining a first probability value that the captured interaction corresponds to a first object of a first version of an application 112 installed on the first user device. The training process can further include classifying the captured interaction based on the first probability value to generate a classified interaction. The training process can further include determining a second probability value that a second object of a second version of the application (e.g., the application 162) installed on the second user device corresponds to the first object. The training process can further include classifying the second object based on the second probability value to generate a classified second object. The training process can further include generating the classified tapping control signal based on the classified interaction and the classified second object.

In several embodiments, operation 406 operates to allow the application testing server 170 to transmit the tapping control signal to the tapping device 104.

Optionally, in several embodiments, the application testing server 170 can capture the interaction at operation 402 by capturing (e.g., by the image capture device 180) a first interaction, such as a click, long press, hard press, soft press, tap-and-move, swipe, any other suitable interaction, or any combination thereof, between a first interaction element displayed on a first display screen of the first user device and a finger of the user. In several embodiments, the application testing server 170 can capture the first interaction using the image capture device 180. In several embodiments, one or more optional operations can operate to allow the application testing server 170 to identify a second interaction element displayed on a second display screen of the second user device and corresponding to the first interaction element. In several embodiments, the tapping control signal can be configured to instruct the tapping device 104 to tap (e.g., click, long press, hard press, soft press, tap-and-move, swipe, any other suitable interaction, or any combination thereof) the second interaction element. In several embodiments, a first display property of the first interaction element can correspond to a second display property of the second interaction element, where the second display property is different from the first display property. In several embodiments, one or more optional operations can operate to allow the application testing server 170 to identify a plurality of electronic objects displayed on the second display screen of the second user device. In several embodiments, one or more optional operations can operate to allow the application testing server 170 to identify the second interaction element based on one of the plurality of electronic objects that corresponds to the first interaction element.

Optionally, in several embodiments and as described with reference to system 200, the application testing server 170 can include the application testing server 210, the first user device can include the first user device 240, the second user device can include the second user device 244, the tapping device 104 can include the first tapping device 222, and the tapping control signal can include a first tapping control signal. In several embodiments, one or more optional operations can operate to allow the application testing server 210 to generate a second tapping control signal configured to instruct a second tapping device 224 to interact with a third user device 244 based on the captured interaction between the user and the first user device 240. In several embodiments, the first user device 240 can be different from the second user device 242, the second user device 242 can be different from the third user device 244, and the third user device 244 can be different from the first user device 240. For example, the first user device 240 and the second user device 242 can have the same manufacturer and model but different operating system versions (e.g., the second user device 242 can have an older operating system version than the first user device 240), while the third user device 244 can have a different manufacturer, model, and operating system than the first user device 240 and the second user device 242. In another example, the first user device 240, the second user device 242, and the third user device 244 can have the same manufacturer and operating system versions but different models and model years (e.g., the first user device 240 can be a 2025 model year of a mid-cycle upgrade of a particular model, the second user device 242 can be a 2024 model year of the standard version of that model, and the third user device 244 can be a 2021 model year of an earlier model, all of which have the same manufacture and have been updated to the latest, or at least the same, operating system version). In several embodiments, one or more optional operations can operate to allow the application testing server 210 to transmit the second tapping control signal to the second tapping device 224.

Components of the System

Figure 5:
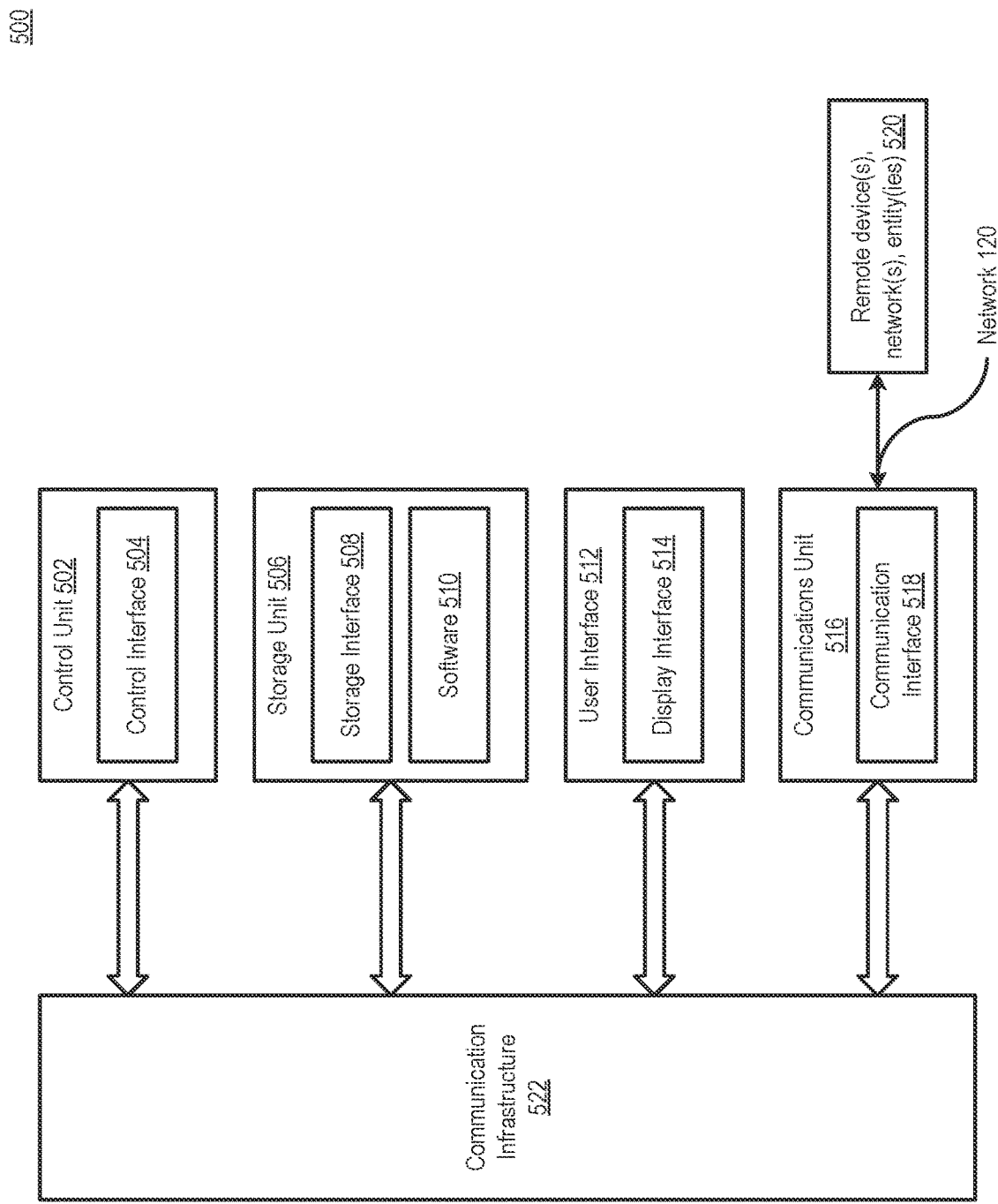
FIG. 5 is an example architecture of components implementing an example system for follow-the-leader tapping control according to some embodiments.

FIG. 5 is an example architecture 500 of components implementing the system 100 and/or the system 200 according to some embodiments. The components may be implemented by any of the devices described with reference to the system 100, such as the client device 110, the client device 160, the cloud server 130, the application database 140, the device database 150, the application testing server 170, the image capture device 180, the image capture device 190, the tapping device 104, or a combination thereof. Additionally, the components may be implemented by any of the devices described with reference to the system 200, such as the application testing server 210; the object recognition classifier machine learning model 212; the tapping devices 222, 224, 226, 228, 230, and 232; the user devices 240, 242, 244, 246, 248, 250, and 252; the image capture devices 280, 282, 284, 286, 288, 290, and 292; or a combination thereof. The components may be further implemented by any of the devices described with reference to the process flow 300 or the method 400.

In several embodiments, the components may include a control unit 502, a storage unit 506, a communication unit 516, and a user interface 512. The control unit 502 may include a control interface 504. The control unit 502 may execute a software 510 (e.g., the application 112, the authentication module 114, the application 162, the authentication module 164, the authentication service 132, the tapping control service 172, or a combination thereof) to provide some or all of the machine intelligence described with reference to system 100. In another example, the control unit 502 may execute a software 510 to provide some or all of the machine intelligence described with reference to the system 200, the process flow 300, and the method 400.

The control unit 502 may be implemented in a number of different ways. For example, the control unit 502 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 504 may be used for communication between the control unit 502 and other functional units or devices of the system 100 or the system 200, or those described with reference to the process flow 300 or the method 400. The control interface 504 may also be used for communication that is external to the functional units or devices of the system 100 or the system 200, or those described with reference to the process flow 300 or the method 400. The control interface 504 may receive information from the functional units or devices of the system 100 or the system 200, those described with reference to the process flow 300 or the method 400, or from remote devices 520, or may transmit information to the functional units or devices of the system 100 or the system 200, those described with reference to the process flow 300 or the method 400, or to remote devices 520. The remote devices 520 refer to units or devices external to the system 100 or the system 200, or those described with reference to the process flow 300 or the method 400.

The control interface 504 may be implemented in different ways and may include different implementations depending on which functional units or devices of the system 100, the system 200, those described with reference to the process flow 300 or the method 400, or remote devices 520 are being interfaced with the control unit 502. For example, the control interface 504 may be implemented with a pressure sensor, an inertial sensor, a microelectromechanical system (MEMS), optical circuitry, waveguides, wireless circuitry, wireline circuitry to attach to a bus, an API, or a combination thereof. The control interface 504 may be connected to a communication infrastructure 522, such as a bus, to interface with the functional units or devices of the system 100, the system 200, those described with reference to the process flow 300 or the method 400, or remote devices 520.

The storage unit 506 may store the software 510. For illustrative purposes, the storage unit 506 is shown as a single element, although it is understood that the storage unit 506 may be a distribution of storage elements. Also for illustrative purposes, the storage unit 506 is shown as a single hierarchy storage system, although it is understood that the storage unit 506 may be in a different configuration. For example, the storage unit 506 may be formed with different storage technologies forming a memory hierarchical system including different levels of caching, main memory, rotating media, or off-line storage. The storage unit 506 may be a volatile memory, a nonvolatile memory, an internal memory, an external memory, or a combination thereof. For example, the storage unit 506 may be a nonvolatile storage such as nonvolatile random access memory (NVRAM), Flash memory, disk storage, or a volatile storage such as static random access memory (SRAM) or dynamic random access memory (DRAM).

The storage unit 506 may include a storage interface 508. The storage interface 508 may be used for communication between the storage unit 506 and other functional units or devices of the system 100, the system 200, or those described with reference to the process flow 300 or the method 400. The storage interface 508 may also be used for communication that is external to the system 100 or the system 200. The storage interface 508 may receive information from the other functional units or devices of the system 100, the system 200, those described with reference to the process flow 300 or the method 400, or from remote devices 520, or may transmit information to the other functional units or devices of system 100 or to remote devices 520. The storage interface 508 may include different implementations depending on which functional units or devices of the system 100, the system 200, those described with reference to the process flow 300 or the method 400, or remote devices 520 are being interfaced with the storage unit 506. The storage interface 508 may be implemented with technologies and techniques similar to the implementation of the control interface 504.

The communication unit 516 may enable communication to devices, components, modules, or units of the system 100, the system 200, those described with reference to the process flow 300 or the method 400, or remote devices 520. For example, the communication unit 516 may permit the system 100 to communicate between the client device 110, the client device 160, the cloud server 130, the application database 140, the device database 150, the application testing server 170, the image capture device 180, the image capture device 190, the tapping device 104, or a combination thereof. In another example, the communication unit 516 may permit the system 200 to communicate between the application testing server 210; the object recognition classifier machine learning model 212; the tapping devices 222, 224, 226, 228, 230, and 232; the user devices 240, 242, 244, 246, 248, 250, and 252; the image capture devices 280, 282, 284, 286, 288, 290, and 292; or a combination thereof. In yet another example, the communication unit 516 may permit the functional units or devices described with reference to the process flow 300 to communicate with each other. In still another example, the communication unit 516 may permit the functional units or devices described with reference to the method 400 to communicate with each other.

The communication unit 516 may further permit the devices of the system 100, the system 200, or those described with reference to the process flow 300 or the method 400, to communicate with remote devices 520 such as an attachment, a peripheral device, or a combination thereof through the network 120.

As previously indicated, the network 120 may span and represent a variety of networks and network topologies. For example, the network 120 may include wireless communication, wired communication, optical communication, ultrasonic communication, or a combination thereof. For example, satellite communication, cellular communication, Bluetooth, IrDA, Wi-Fi, and WiMAX are examples of wireless communication that may be included in the network 120. Cable, Ethernet, DSL, fiber optic lines, FTTH, and POTS are examples of wired communication that may be included in the network 120. Further, the network 120 may traverse a number of network topologies and distances. For example, the network 120 may include direct connection, PAN, LAN, MAN, WAN, or a combination thereof.

The communication unit 516 may also function as a communication hub allowing system 100 to function as part of the network 120 and not be limited to be an end point or terminal unit to the network 120. The communication unit 516 may include active and passive components, such as microelectronics or an antenna, for interaction with the network 120. The communication unit 516 may include a communication interface 518. The communication interface 518 may be used for communication between the communication unit 516 and other functional units or devices of system 100 or to remote devices 520. The communication interface 518 may receive information from the other functional units or devices of system 100, or from remote devices 520, or may transmit information to the other functional units or devices of the system 100 or to remote devices 520. The communication interface 518 may include different implementations depending on which functional units or devices are being interfaced with the communication unit 516. The communication interface 518 may be implemented with technologies and techniques similar to the implementation of the control interface 504.

The user interface 512 may present information generated by system 100. In several embodiments, the user interface 512 allows a user to interface with the devices of system 100 or remote devices 520. The user interface 512 may include an input device and an output device. Examples of the input device of the user interface 512 may include a keypad, buttons, switches, touchpads, soft-keys, a keyboard, a mouse, or any combination thereof to provide data and communication inputs. Examples of the output device may include a display interface 514. The control unit 502 may operate the user interface 512 to present information generated by system 100. The control unit 502 may also execute the software 510 to present information generated by system 100, or to control other functional units of system 100. The display interface 514 may be any graphical user interface such as a display, a projector, a video screen, or any combination thereof.

The above detailed description and embodiments of the disclosed system 100 are not intended to be exhaustive or to limit the disclosed system 100 to the precise form disclosed above. While specific examples for system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The system 100, the system 200, the process flow 300, and the method 400 are cost-effective, highly versatile, and accurate, and may be implemented by adapting components for ready, efficient, and economical manufacturing, application, and utilization. Another important aspect of embodiments of the present disclosure is that they valuably support and service the trend of reducing costs, simplifying systems, and/or increasing system performance.

These and other valuable aspects of the embodiments of the present disclosure consequently further the state of the technology to at least the next level. While the disclosed embodiments have been described as the best mode of implementing system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the disclosure is not to be restricted except in light of the attached claims and their equivalents.

What is claimed is:

1. A computer-implemented method for providing follow-the-leader tapping control signals to one or more tapping devices, the computer-implemented method comprising:
    capturing, by one or more computing devices, an interaction between a first interaction element of a first user device and a user of the first user device;
    identifying, by the one or more computing devices, a second interaction element of a second user device that corresponds to the first interaction element;
    generating, by the one or more computing devices, a tapping control signal configured to instruct the one or more tapping devices to interact with the second interaction element of the second user device to reproduce the interaction on the second user device; and
    transmitting, by the one or more computing devices, the tapping control signal to the one or more tapping devices.

2. The computer-implemented method of claim 1, wherein the capturing comprises:
    capturing, by the one or more computing devices, the interaction between the first interaction element displayed on a display screen of the first user device and a finger of the user; and
    wherein the generating comprises generating the tapping control signal configured to instruct the one or more tapping devices to tap the second interaction element to reproduce the interaction on the second user device.

3. The computer-implemented method of claim 1, wherein:
    a first display property of the first interaction element corresponds to a second display property of the second interaction element; and
    the second display property is different from the first display property.

4. The computer-implemented method of claim 1 further comprising:
identifying, by the one or more computing devices, a plurality of electronic objects displayed on a display screen of the second user device; and
wherein the identifying, the second interaction element comprises identifying the second interaction element based on one of the plurality of electronic objects that corresponds to the first interaction element.

5. The computer-implemented method of claim 1, wherein the capturing comprises:
capturing the interaction using an image capture device communicatively coupled to the one or more computing devices.

6. The computer-implemented method of claim 1, wherein the generating the tapping control signal comprises:
generating, by the one or more computing devices, the tapping control signal using a computer vision technique.

7. The computer-implemented method of claim 1, wherein the generating the tapping control signal comprises:
classifying, by the one or more computing devices, the tapping control signal as a classified tapping control signal using an object recognition classifier machine learning model trained by a process comprising:
determining, by the one or more computing devices, a first probability value that the captured interaction corresponds to a first object of a first version of an application installed on the first user device,
classifying, by the one or more computing devices, the captured interaction based on the first probability value to generate a classified interaction,
determining, by the one or more computing devices, a second probability value that a second object of a second version of the application installed on the second user device corresponds to the first object,
classifying, by the one or more computing devices, the second object based on the second probability value to generate a classified second object, and
generating, by the one or more computing devices, the classified tapping control signal based on the classified interaction and the classified second object,
wherein the tapping control signal comprises the classified tapping control signal.

8. The computer-implemented method of claim 1, wherein:
the tapping control signal is a first tapping control signal; and
the computer-implemented method further comprises:
generating, by the one or more computing devices, a second tapping control signal configured to instruct the one or more tapping devices to interact with a third interaction element of a third user device to reproduce the interaction on the third user device; and
transmitting, by the one or more computing devices, the second tapping control signal to the one or more tapping devices.

9. The computer-implemented method of claim 8, wherein:
the first user device is different from the second user device;
the second user device is different from the third user device; and
the third user device is different from the first user device.

10. A non-transitory computer readable medium including instructions for causing a processor to perform operations for providing follow-the-leader tapping control signals to one or more tapping devices, the operations comprising:
capturing an interaction between a first interaction element of a first user device and a user of the first user device;
identifying a second interaction element of a second user device that corresponds to the first interaction element;
generating a tapping control signal configured to instruct the one or more tapping devices to interact with the second interaction element of the second user device to reproduce the interaction on the second user device; and
transmitting the tapping control signal to the one or more tapping devices.

11. The non-transitory computer readable medium of claim 10, wherein the capturing comprises:
capturing the interaction between the first interaction element displayed on a display screen of the first user device and a finger of the user; and
wherein the generating comprises generating the tapping control signal configured to instruct the one or more tapping devices to tap the second interaction element to reproduce the interaction on the second user device.

12. The non-transitory computer readable medium of claim 10, wherein the capturing comprises:
capturing the interaction using an image capture device.

13. The non-transitory computer readable medium of claim 10, wherein
the generating the tapping control signal comprises:
generating the tapping control signal using a computer vision technique.

14. The non-transitory computer readable medium of claim 10, wherein the generating the tapping control signal comprises:
classifying the tapping control signal as a classified tapping control signal using an object recognition classifier machine learning model trained by a process comprising:
determining a first probability value that the captured interaction corresponds to a first object of a first version of an application installed on the first user device,
classifying the captured interaction based on the first probability value to generate a classified interaction,
determining a second probability value that a second object of a second version of the application installed on the second user device corresponds to the first object,
classifying the second object based on the second probability value to generate a classified second object, and
generating the classified tapping control signal based on the classified interaction and the classified second object,
wherein the tapping control signal comprises the classified tapping control signal.

15. The non-transitory computer readable medium of claim 10, wherein:
the tapping control signal is a first tapping control signal; and
the operations further comprise:
generating a second tapping control signal configured to instruct the one or more tapping devices to interact with a third interaction element of a third user to reproduce the interaction on the third user device; and
transmitting the second tapping control signal to one or more tapping devices.

16. A computing system for providing follow-the-leader tapping control signals to one or more tapping devices, the computing system comprising:
- a storage unit configured to store instructions;
- a control unit coupled to the storage unit and configured to process the stored instructions to:
  - capture an interaction between a first interaction element of a first user device and a user of the first user device;
  - identify a second interaction element of a second user device that corresponds to the first interaction element;
  - generate a tapping control signal configured to instruct the one or more tapping devices to interact with the second interaction element of the second user device to reproduce the interaction on the second user device; and
  - transmit the tapping control signal to the one or more tapping devices.

17. The computing system of claim 16, wherein the control unit is configured to process the stored instructions to:
- capture the interaction between the first interaction element displayed on a display screen of the first user device and a finger of the user; and
- generate the tapping control signal is configured to instruct the one or more tapping devices to tap the second interaction element to reproduce the interaction on the second user device.

18. The computing system of claim 17, wherein the control unit is configured to process the stored instructions to:
- capture the interaction using an image capture device.

19. The computing system of claim 16, wherein the control unit is configured to process the stored instructions to:
- generate the tapping control signal using a computer vision technique.

20. The computing system of claim 16, wherein the control unit is further configured to process the stored instructions to:
- classify the tapping control signal as a classified tapping control signal using an object recognition classifier machine learning model trained by a process comprising:
- determine a first probability value that the captured interaction corresponds to a first object of a first version of an application installed on the first user device,
- classify the captured interaction based on the first probability value to generate a classified interaction,
- determine a second probability value that a second object of a second version of the application installed on the second user device corresponds to the first object,
- classify the second object based on the second probability value to generate a classified second object, and
- generate the classified tapping control signal based on the classified interaction and the classified second object,
- wherein the tapping control signal comprises the classified tapping control signal.

* * * * *